United States Patent
Lee et al.

(10) Patent No.: US 8,546,026 B2
(45) Date of Patent: Oct. 1, 2013

(54) GAS-LIQUID SEPARATOR, HYDROGEN GENERATING APPARATUS, AND FUEL CELL GENERATION SYSTEM HAVING THE SAME

(75) Inventors: Eon-Soo Lee, Seoul (KR); Jae-Hyuk Jang, Seoul (KR); Hye-Yeon Cha, Yongin-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 568 days.

(21) Appl. No.: 12/479,372

(22) Filed: Jun. 5, 2009

(65) Prior Publication Data

US 2010/0092818 A1   Apr. 15, 2010

(30) Foreign Application Priority Data

Oct. 15, 2008  (KR) .................. 10-2008-0101285

(51) Int. Cl.
*H01M 8/00* (2006.01)
*H01M 8/06* (2006.01)
*B03C 3/00* (2006.01)
*B03C 3/14* (2006.01)
*B01D 19/00* (2006.01)
*B01D 33/15* (2006.01)

(52) U.S. Cl.
USPC ............... 429/400; 429/411; 96/61; 96/56; 96/216; 210/781

(58) Field of Classification Search
USPC .............................................. 210/511, 512.1
See application file for complete search history.

(56) References Cited

U.S. PATENT DOCUMENTS

2008/0193810 A1* 8/2008 Gil et al. ................... 429/21
2009/0145860 A1* 6/2009 Allen et al. ................ 210/780

* cited by examiner

*Primary Examiner* — Curtis Mayes
*Assistant Examiner* — Bijay Saha
(74) *Attorney, Agent, or Firm* — McDermott Will & Emery LLP

(57) ABSTRACT

Disclosed are a gas-liquid separator, a hydrogen generating apparatus, and a fuel cell generation system, having the same. The gas-liquid separator can include an inflow path, into which a fluid material having a liquid and a gas flows; a centrifugal path, connected to the inflow path to receive the fluid material and formed spirally such that the fluid material is separated into the liquid and the gas by difference in centrifugal forces, an outer side of the centrifugal path having stronger affinity for the liquid than an inner side of the centrifugal path; and an outflow path, connected to the centrifugal path and discharging the liquid and the gas, which have been separated in the centrifugal path. With the present invention, it is possible to efficiently separate gas such as hydrogen and liquid such as a electrolyte solution without complex devices.

12 Claims, 8 Drawing Sheets

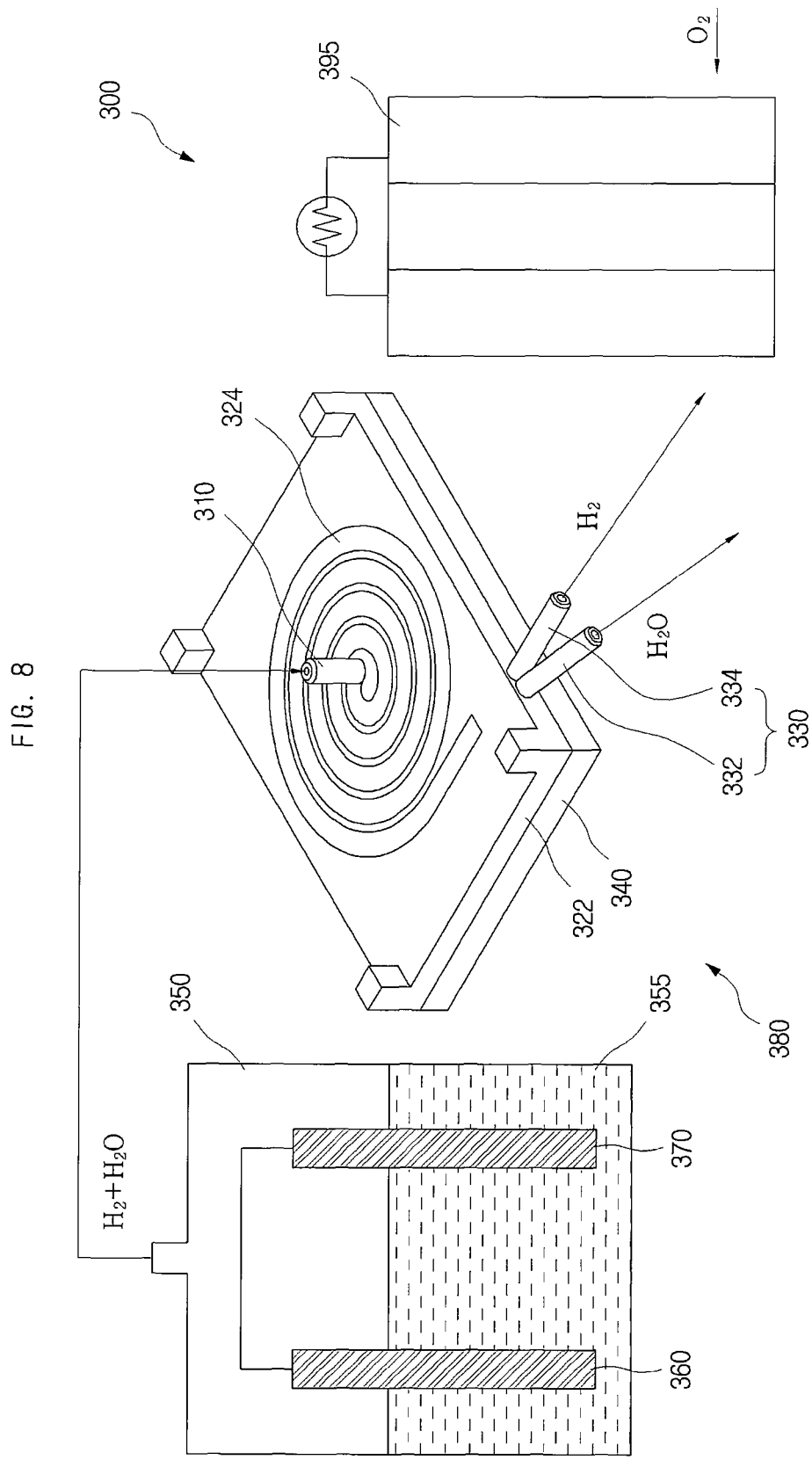

GAS-LIQUID SEPARATOR, HYDROGEN GENERATING APPARATUS, AND FUEL CELL GENERATION SYSTEM HAVING THE SAME

CROSS-REFERENCE TO RELATED APPLICATIONS

This application claims the benefit of Korean Patent Application No. 10-2008-0101285, filed with the Korean Intellectual Property Office on Oct. 15, 2008, the disclosure of which is incorporated herein by reference in its entirety.

BACKGROUND

1. Technical Field

The present invention relates to a gas-liquid separator and a hydrogen generating apparatus and a fuel cell generation system having the same.

2. Description of the Related Art

A fuel cell is an apparatus that converts the chemical energy of fuel (hydrogen, LNG, LPG, methanol, etc.) and air directly into electricity and heat, by means of electrochemical reactions. In contrast to conventional power generation technologies, which employ the processes of burning fuel, generating vapor, driving turbines, and driving power generators, the utilization of fuel cells does not entail a combustion process or include a driving device. As such, the fuel cell is a new technology for generating power that offers high efficiency and few environmental problems.

Methods used in generating hydrogen for the fuel of the fuel cell can be separated into an oxidation reaction of aluminum, a hydrolysis of metal borohydrides, and a metal electrodes reaction. Among these, the method of using metal electrodes can efficiently regulate the rate of hydrogen that is generated. This is a method in which the electrons, obtained when magnesium in the electrode is ionized to $Mg^{2+}$ ions, are moved through a wire and connected to another metal object, where hydrogen is generated by the dissociation of water. The amount of hydrogen generated can be regulated, as it is related to the distance between the electrodes and the sizes of the electrodes.

Since such hydrogen generating method is performed by using water, however, the water may be included in the generated hydrogen. This not only lowers the efficiency of using the water, thereby dropping the total amount of hydrogen generated, but also rapidly decreases the efficiency of storing the hydrogen in a hydrogen storage.

SUMMARY

The present invention provides a gas-liquid separator and a hydrogen generating apparatus and a fuel cell generation system having the gas-liquid separator that can efficiently separate a gas, such as hydrogen, and a liquid, such as an electrolyte solution.

An aspect of present invention features a gas-liquid separator including an inflow path, into which a fluid material flows, the fluid material having a liquid and a gas; a centrifugal path, connected to the inflow path to receive the fluid material and formed spirally such that the fluid material is separated into the liquid and the gas by a difference in centrifugal forces, an outer side of the centrifugal path having stronger affinity for the liquid than an inner side of the centrifugal path; and an outflow path, connected to the centrifugal path and discharging the liquid and the gas, which have been separated in the centrifugal path.

At this time, the outer side of the centrifugal path can be hydrophilic.

The inner side of the centrifugal path can be hydrophobic.

The centrifugal path can have an increasing radius of curvature from one side to the other side, and is placed on a same virtual plane.

At this time, the centrifugal path can be formed by being separated by a main plate, on which a spiral groove is formed, and a cover plate, which covers an opening of the spiral groove.

The gas-liquid separator can further include a cooling plate, configured to condense water, which has been included in the gas and thus supplied to the centrifugal path.

The outflow path can include a liquid discharge path, configured to discharge the liquid; and a gas discharge path, configured to discharge the gas.

Another aspect of present invention features a hydrogen generating apparatus, including an electrolyzer, configured to contain an electrolyte solution; an anode, located inside the electrolyzer and generating an electron; a cathode, located inside the electrolyzer and receiving the electron from the anode to generate hydrogen; an inflow path, into which a fluid material flows, the fluid material having the electrolyte solution and the hydrogen; a centrifugal path, connected to the inflow path to receive the fluid material and formed spirally such that the fluid material is separated into the electrolyte solution and the hydrogen by a difference in centrifugal forces, an outer side of the centrifugal path having stronger affinity for the electrolyte solution than an inner side of the centrifugal path; and an outflow path, connected to the centrifugal path and discharging the electrolyte solution and the hydrogen, which have been separated in the centrifugal path At this time, the outer side of the centrifugal path can be hydrophilic.

The inner side of the centrifugal path can be hydrophobic.

The centrifugal path can have an increasing radius of curvature from one side to the other side, and is placed on a same virtual plane.

The centrifugal path can be formed by being separated by a main plate, on which a spiral groove is formed, and a cover plate, which covers an opening of the spiral groove.

The hydrogen generating apparatus can further include a cooling plate, configured to condense water, which has been included in the hydrogen and thus supplied to the centrifugal path.

The outflow path can include a liquid discharge path, configured to discharge the electrolyte solution; and a gas discharge path, configured to discharge the hydrogen.

Yet another aspect of present invention features a fuel cell generating system, including an electrolyzer, configured to contain an electrolyte solution; an anode, located inside the electrolyzer and generating an electron; a cathode, located inside the electrolyzer and receiving the electron from the anode to generate hydrogen; an inflow path, into which a fluid material flows, the fluid material having the electrolyte solution and the hydrogen; a centrifugal path, connected to the inflow path to receive the fluid material and formed spirally such that the fluid material is separated into the electrolyte solution and the hydrogen by a difference in centrifugal forces, an outer side of the centrifugal path having stronger affinity for the electrolyte solution than an inner side of the centrifugal path; an outflow path, connected to the centrifugal path and discharging the electrolyte solution and the hydrogen, which have been separated in the centrifugal path; and a fuel cell, configured to convert chemical energy of the hydrogen, discharged from the centrifugal path, to electrical energy.

The outer side of the centrifugal path can be hydrophilic.

The inner side of the centrifugal path can be hydrophobic.

The centrifugal path can have an increasing radius of curvature from one side to the other side, and is placed on a same virtual plane.

The centrifugal path can be formed by being separated by a main plate, on which a spiral groove is formed, and a cover plate, which covers an opening of the spiral groove.

The fuel cell generating system can further include a cooling plate, configured to condense water, which has been included in the hydrogen and thus supplied to the centrifugal path.

The outflow path can include a liquid discharge path, configured to discharge the electrolyte solution; and a gas discharge path, configured to discharge the hydrogen.

BRIEF DESCRIPTION OF THE DRAWINGS

FIG. 8 is a brief view showing a fuel cell generation system according to an embodiment based on another aspect of the present invention.

DETAIL DESCRIPTION

Figure 1:
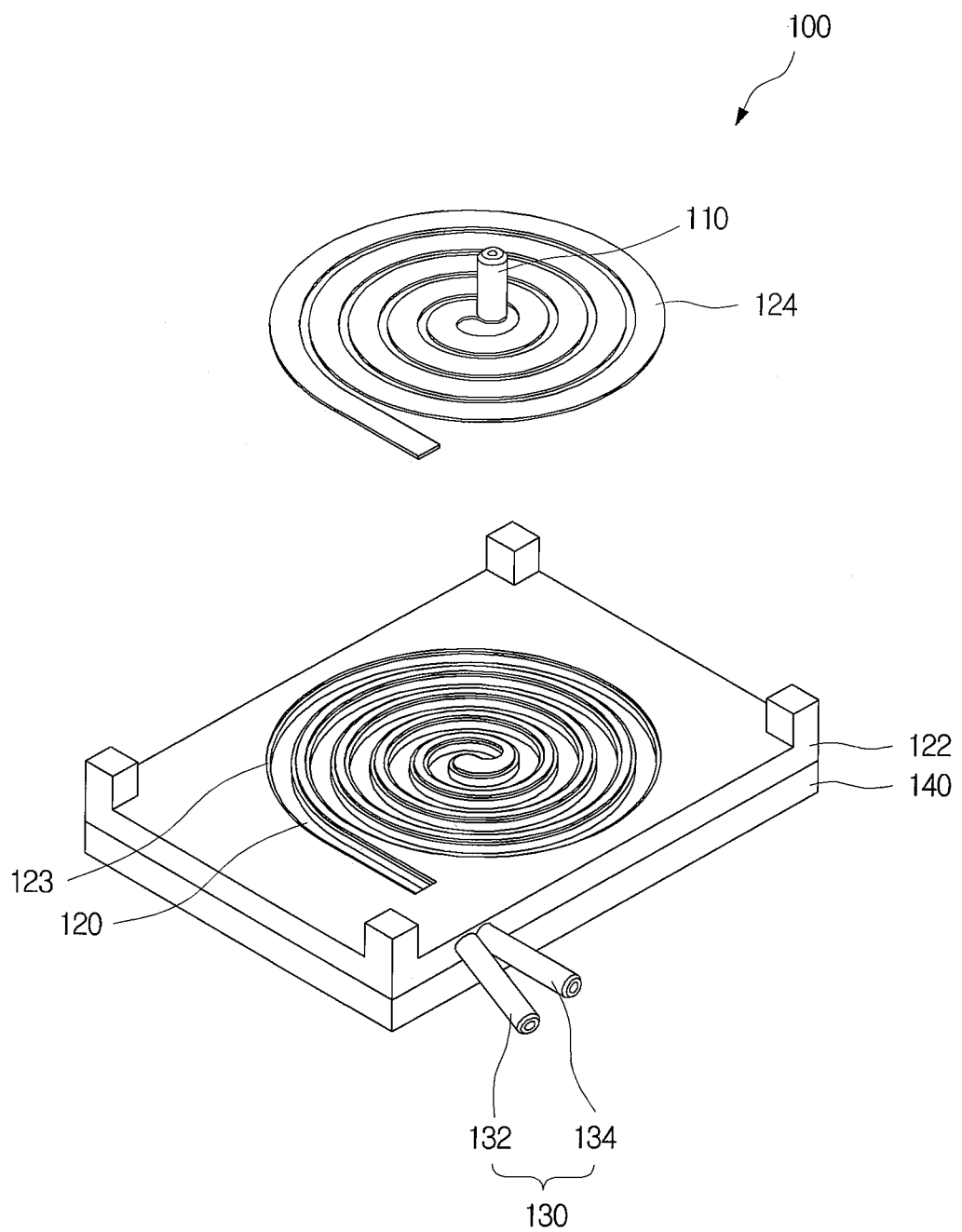
FIG. 1 is an exploded perspective view showing a gas-liquid separator according to an embodiment based on an aspect of the present invention.

A gas-liquid separator, a hydrogen generating apparatus, and a fuel cell generation system, having the gas-liquid separator in accordance with an embodiment of the present invention will be described in detail with reference to the accompanying drawings. Throughout the drawings, similar elements are given similar reference numerals. Throughout the description of the present invention, when describing a certain technology is determined to evade the point of the present invention, the pertinent detailed description will be omitted.

When one element is described as being "connected" to another element, it shall be construed as being connected to another element directly but also as possibly having yet another element in between.

Figure 2:
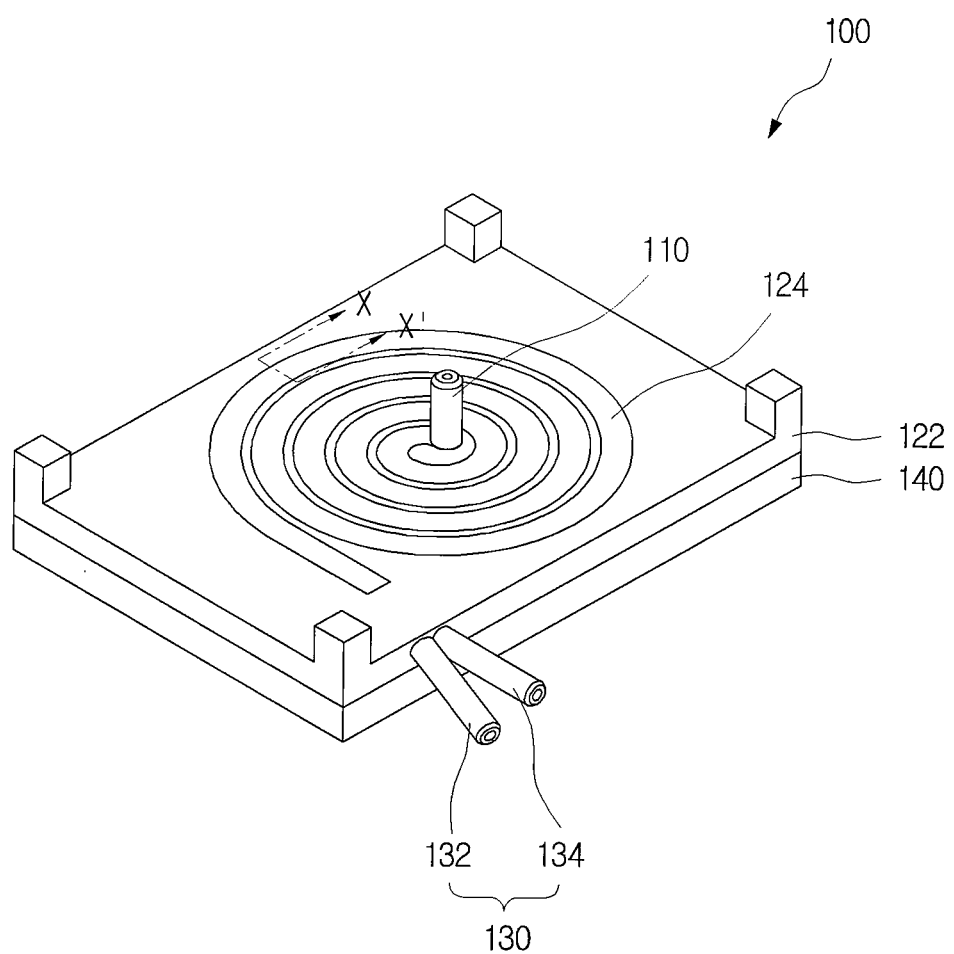
FIG. 2 is a perspective view showing a gas-liquid separator according to an embodiment based on an aspect of the present invention.
Figure 3:
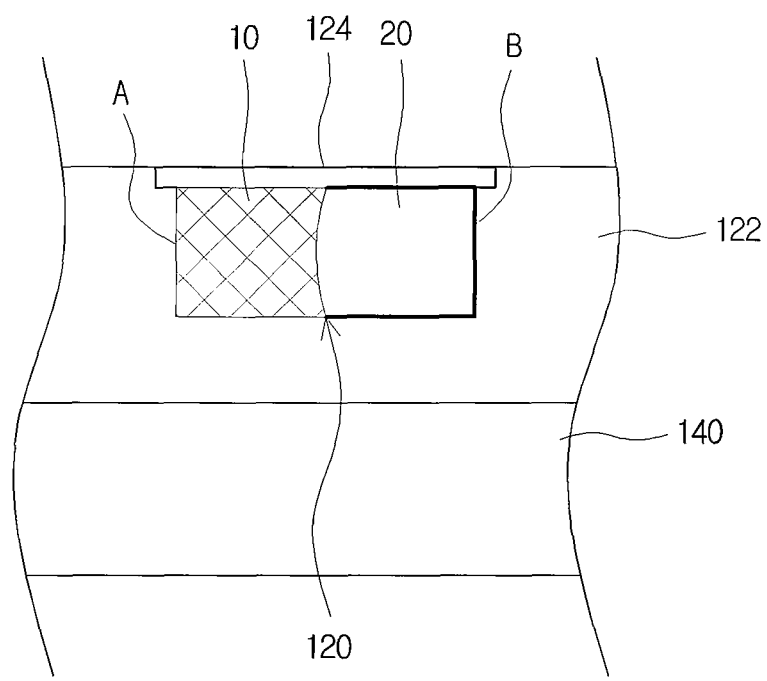
FIG. 3 shows the state in which a gas and a liquid are separated from each other in a gas-liquid separator according to an embodiment based on an aspect of the present invention, when viewed along the X-X' line of FIG. 2.

FIG. 1 is an exploded perspective view showing a gas-liquid separator according to an embodiment based on an aspect of the present invention, and FIG. 2 is a perspective view showing a gas-liquid separator according to an embodiment based on an aspect of the present invention. FIG. 3 shows the state in which a gas and a liquid are separated from each other in a gas-liquid separator according to an embodiment based on an aspect of the present invention when viewed along the X-X' line of FIG. 2.

In accordance with an embodiment of the present invention, a gas-liquid separator 100 can include an inflow path 110, into which a fluid material having a gas and a liquid flows; a centrifugal path 120, which is connected to the inflow path 110 to receive the fluid material and is spirally formed such that the fluid material is separated into the gas and the liquid by the difference in centrifugal forces, an outer side A of the centrifugal path 120 having stronger liquid affinity than an inner side B of the centrifugal path 120; and an outflow path 130, connected to the centrifugal path 120 and discharging the liquid and the gas, separated in the centrifugal path 120.

In accordance with an embodiment of the present invention, it is possible to efficiently separate the gas, for example, hydrogen and the liquid, for example, an electrolyte solution by using the spiral centrifugal path 120, of which the outer side A has stronger liquid affinity than the inner side B.

Hereinafter, each element will be described in more detail with reference to FIG. 1 through FIG. 3.

The inflow path 110 can be an element into which a fluid material having a gas or a liquid or mixed with a gas and a liquid flows. The inflow path 110 can be connected to an electrolyzer 250 (refer to FIG. 7) of a hydrogen generating apparatus 200 (refer to FIG. 7), for example. The hydrogen (i.e. gas) generated from a cathode 270 (refer to FIG. 7) and the electrolyte solution (i.e. liquid) of the electrolyzer 250 (refer to FIG. 7) can flow into the inflow path 110.

The centrifugal path 120 can be connected to the inflow path 110 to receive the fluid material from the inflow path 110. The centrifugal path 120 can be spirally formed such that the fluid material is separated into the gas and the liquid by the difference in centrifugal forces. In the centrifugal path 120, the outer side A can have stronger liquid affinity than the inner side B.

In particular, the centrifugal path 120 can be formed to spirally bend about a virtual center axis such that the fluid material inside the centrifugal path is circulated about the virtual center axis. For example, the density of the liquid is 2000 or more times heavier than that of the gas in the supplied fluid material. Accordingly, the centrifugal force of the liquid is 2000 or more times stronger than that of the gas. Thus, a liquid 10 of the fluid material can flow along the outer side A, and a gas 20 of the fluid material can flow along the inner side B.

At this time, since the outer side A has stronger liquid affinity than the inner side B, this can prevent the separated liquid and gas from being re-mixed, by using the difference of the centrifugal forces caused by the spiral shape, thereby more efficiently separate the liquid and the gas as described above.

In other words as shown in FIG. 3, the surface treatment can be performed to allow the outer side A of the centrifugal path 120 to be hydrophilic and the inner side B of the centrifugal path 120 to be hydrophobic such that the liquid affinity of the outer side B is stronger than that of the inner side B in the centrifugal path 120.

In the centrifugal path 120, the radius of curvature can be increased from one side to the other side. The centrifugal path 120 can be placed on a same virtual plane. That is, as shown in FIG. 1 and FIG. 2, the centrifugal path 120 can have a spiral shape in which the radius of curvature is increased from one side to the other side. The spiral-shaped centrifugal path 120 can be placed on the same virtual plane.

Accordingly, the whole thickness of the gas-liquid separator 100 can be reduced. Thus, the large additional space for a hydrogen generating apparatus 280 (refer to FIG. 7) to be mounted can become unnecessary.

At this time, the centrifugal path 120 can be separated from the outside by being enveloped by a main plate 122, on which a spiral groove 123 is formed, and a cover plate 124, which covers an opening of the spiral groove 123. Accordingly, it is possible to more easily form the centrifugal path 120 having a spiral structure in which the radius of curvature is increased in the same planar surface.

The hydrophilic treatment and hydrophobic treatment can be more easily performed in the outer side A and the inner side B, respectively, of the centrifugal path 120 through the opening of the spiral groove 123 in the state in which the cover plate 124 is separated as shown in FIG. 1, as the centrifugal path 120 is made by forming the spiral groove 123 on the main plate 122.

At this time, the other side, close to the outflow path 130, of the centrifugal path 120 can be extended to the inside of the main plate 122 and connected to the outflow path 130.

As such, the centrifugal path 120 can be spirally formed by the main plate 122 and the cover plate 124 such that the radius of curvature is increased on the same planar surface. Accordingly, even though a cooling plate to be described below is formed to have a simple flat-plate shape as shown in FIG. 1 and FIG. 2, a cooling plate 140 to be described below can more easily be in close contact with the centrifugal path 120.

The centrifugal path 120 can also have various cross-sectional surfaces such as rectangular or circular surface.

In addition, the centrifugal path 120 can have the radius of curvature that can be increased at a regular rate. Such the regular increase of the radius of curvature of the centrifugal path 120 can prevent the centrifugal force having an effect on a fluid material from rapidly being changed when the fluid material flows in the centrifugal path 120. The gas and the liquid can be more stably separated.

The outflow path 130 can be connected to the centrifugal path 120 to discharge the gas and the liquid that have been separated in the centrifugal path 120. The outflow path 130, as shown in FIG. 1 and FIG. 2, can include a liquid discharge path 132, discharging the liquid and a gas discharge path 134 discharging the gas.

In particular, the liquid discharge path 132 can be connected to the outer side A of the centrifugal path 120 to discharge the liquid to an external device, for example, the electrolyzer 250 (refer to FIG. 7) of the hydrogen generating apparatus 200 (refer to FIG. 7), and the gas discharge path 134 can be connected to the inner side B of the centrifugal path 120 to discharge the gas to an external device, for example, a fuel electrode of a fuel cell 395 (refer to FIG. 8).

The cooling plate 140 can condense water supplied to the centrifugal path 120. The water may be included in the fluid material that has flowed into the inflow path 110. In this case, the cooling plate 140 can condense and remove the water from the gas, thereby separating the more highly pure gas from the liquid.

In the hydrogen generating apparatus 200 (refer to FIG. 7), for example, the hydrogen (i.e. gas) generated from the cathode 270 (refer to FIG. 7) can flow into the inflow path 110 of the gas-liquid separator 110, together with the electrolyte solution (i.e. liquid) and water. Particularly, since the hydrogen is generated by way of dissociation of the electrolyte solution 255 (refer to FIG. 7), some of the electrolyte solution 255 may also flow into the inflow path 110, together with the hydrogen. The oxidation-reduction reaction for generating the hydrogen is the exothermic reaction. Accordingly, since the temperature of the electrolyte solution 255 (refer to FIG. 7) can be increased to 70 or 80° C., the hydrogen may be mixed with much water evaporated from the electrolyte solution 255 before flowing into the inflow path 110.

Accordingly, when the fluid material mixed with the electrolyte solution and water, which has flowed into the inflow path 110, passes through the centrifugal path 120, the cooling plate 140 can condense the water, thereby improve the purity of the hydrogen that flows out through the outflow path 130.

At this time, the cooling plate 140 can have a flat-plate shape as shown in FIG. 1 and FIG. 2. Since the centrifugal path 120 is formed in the spiral form in which the radius of curvature is increased on the same virtual plane, the cooling plate 140 can be closely mounted in the main plate 122 which is placed below the centrifugal path 120. This can reduce the overall size and improve the cooling efficiency.

Described below is a gas-liquid separator according to another embodiment based on an aspect of the present invention.

Figure 4:
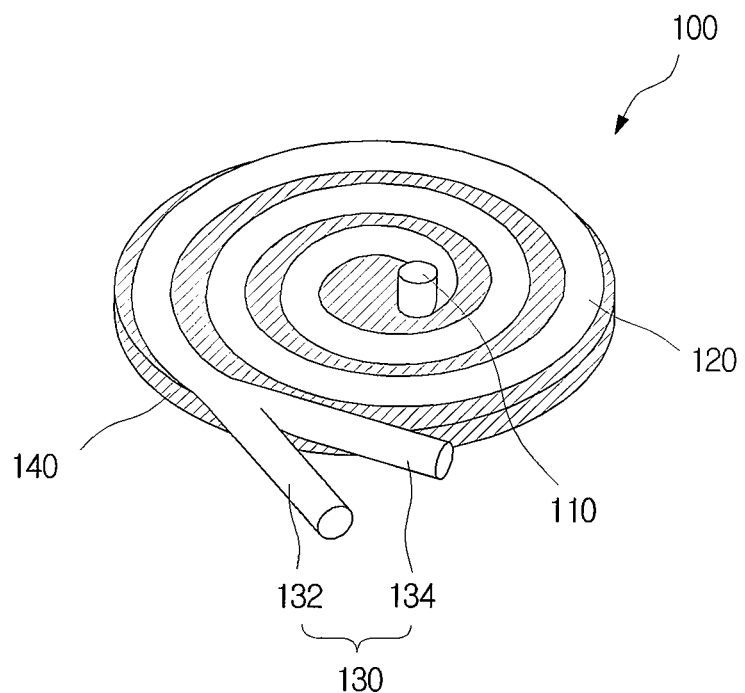
FIG. 4 is a perspective view showing a gas-liquid separator according to another embodiment based on an aspect of the present invention.
Figure 5:
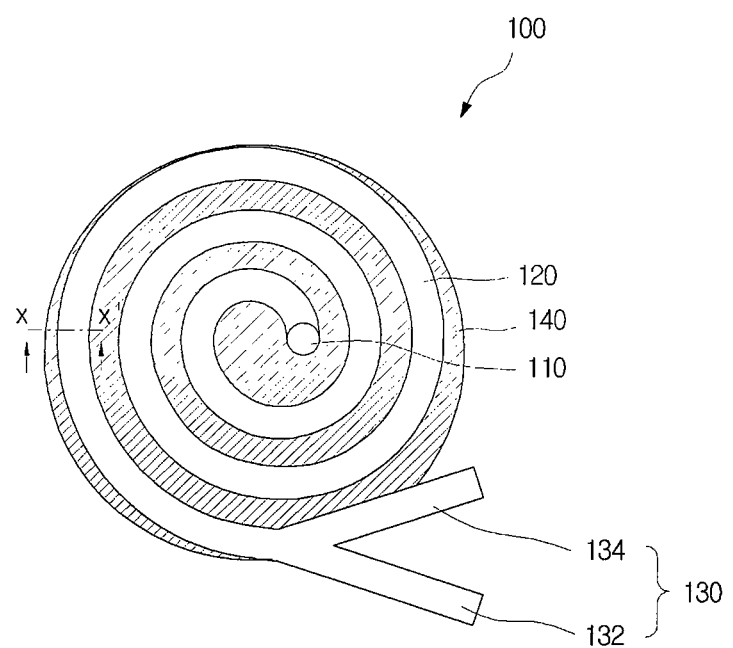
FIG. 5 is a plan view showing a gas-liquid separator according to another embodiment based on an aspect of the present invention.
Figure 6:
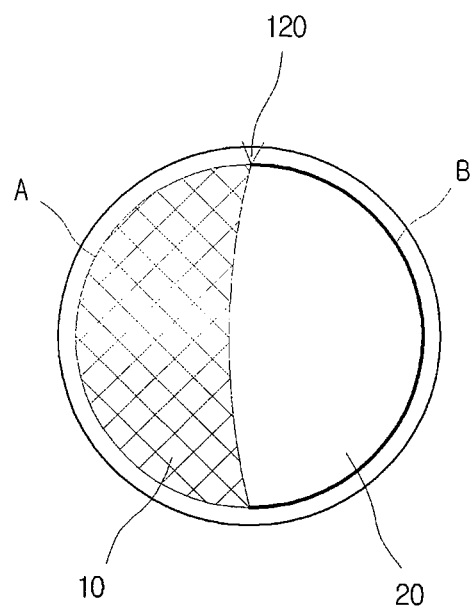
FIG. 6 shows the state in which a gas and a liquid are separated from each other in a centrifugal path according to another embodiment based on an aspect of the present invention, when viewed along the X-X' line of FIG. 5.

FIG. 4 is a perspective view showing a gas-liquid separator according to another embodiment based on an aspect of the present invention, and FIG. 5 is a plan view showing a gas-liquid separator according to another embodiment based on an aspect of the present invention. FIG. 6 shows the state in which a gas and a liquid are separated from each other in a centrifugal path according to another embodiment based on an aspect of the present invention when viewed along the X-X' line of FIG. 5.

In accordance with another embodiment of the present invention, the gas-liquid separator can have the same or similar configuration and functions of the inflow path 110, the centrifugal path 120, the outflow path 130, the liquid discharge path 132, the gas liquid discharge path 134, and the cooling system 140. However, there is the difference in the method of forming the centrifugal path. Another embodiment of the present invention will be described below on the basis of the difference in the method of forming the centrifugal path.

As shown in FIG. 4 and FIG. 5, the centrifugal path 120 can be separated from the outside by a tube having a predetermined thickness. As shown in FIG. 6, a hydrophilic treatment can be performed in an outer side A of the inside of the tube, and a hydrophobic treatment can be performed in an inner side B of the inside of the tube.

As such, the centrifugal path 120 separated by the tube can be formed by processing each part of the tube so as to expose the inside of the tube and performing the hydrophilic or hydrophobic treatment and then coupling the parts of the tube to each other. Alternatively, the centrifugal path 120 can be manufactured in various other ways.

In accordance with another embodiment of the present invention, the centrifugal path 120 can also have a rectangular or circular surface.

Described below is showing a hydrogen generating apparatus according to an embodiment based on another aspect of the present invention.

Figure 7:
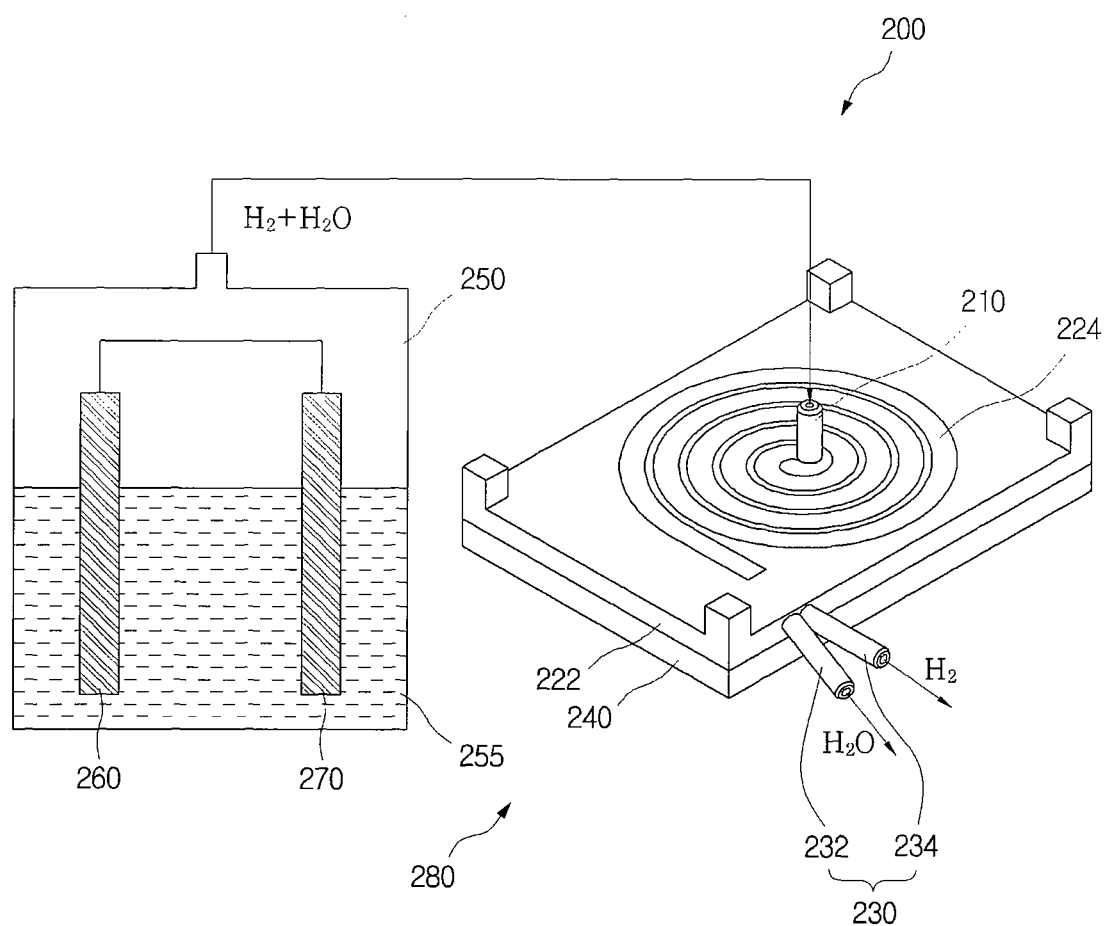
FIG. 7 is a brief view showing a hydrogen generating apparatus according to an embodiment based on another aspect of the present invention.

FIG. 7 is a brief view showing a hydrogen generating apparatus 200 according to an embodiment based on another aspect of the present invention.

In accordance with an embodiment based on another aspect of the present invention, a hydrogen generating apparatus can include an electrolyzer 250 containing an electrolyte solution 255; an anode 260, located inside the electrolyzer 250 and generating an electron; a cathode 270, located inside the electrolyzer 250 and receiving the electron from the anode 260 to generate hydrogen; an inflow path 210, into which a fluid material having the electrolyte solution and the hydrogen flows; the centrifugal path 120, connected to the inflow path 210 to receive the fluid material and formed spirally such that the fluid material is separated into the electrolyte solution and the hydrogen by the difference in centrifugal forces, an outer side of the centrifugal path 120 having stronger affinity for the electrolyte solution than an inner side of the centrifugal path 120; and an outflow path 230, discharging the electrolyte solution and the hydrogen, separated in the centrifugal path 120.

As a result in accordance with an embodiment based on another aspect of the present invention, it is possible to efficiently separate the hydrogen, generated in the cathode 270, from the electrolyte solution without complex devices by using the spiral centrifugal path 120 in which the outer side has stronger affinity for the liquid than the inner side, thereby generating highly pure hydrogen.

In the hydrogen generating apparatus 200 according to an embodiment based on another aspect of the present invention, a gas-liquid separator 280, the centrifugal path 120 (refer to FIG. 1), a main plate 222, a cover plate 224, the outflow path 230, a liquid discharge path 232, a gas discharge path 234, and a cooling plate 240 can have the same or corresponding configurations and functions as compared with those of the aforementioned embodiments. Accordingly, the overlapped description will be omitted. Hereinafter, he electrolyzer 250, the electrolyte solution 255, the anode 260, and the cathode 270, which are different from those of the aforementioned embodiments will be described.

The electrolyzer 250 can contain the electrolyte solution 255 that releases hydrogen by way of dissociation. The anode 260 and the cathode 270 can be located inside the electrolyzer 250. Accordingly, a hydrogen generating reaction can be performed by the electrolyte solution 255 contained inside the electrolyzer 250.

A LiCl, KCl, NaCl, $KNO_3$, $NaNO_3$, $CaCl_2$, $MgCl_2$, $K_2SO_4$, $Na_2SO_4$, $MgSO_4$ or AgCl solution can be used for the electrolyte solution 255. The electrolyte solution 255 can also include a hydrogen ion.

The anode 260, which is an active electrode, can be located inside the electrolyzer 250 to generate electrons. The anode 260 can be made of magnesium (Mg), for example, and due to the difference in ionization tendency between the anode 260 and hydrogen, the anode 260 can release electrons into the water and to be oxidized into magnesium ions ($Mg^{2+}$).

The generated electrons can travel to the cathode 270. The anode 260 may be expended in accordance with the electrons generated, and can be configured to allow replacement after a certain period of time. Moreover, the anode 260 can be made of a metal having a greater tendency to ionize than the material used for the cathode 270 to be described below.

The cathode 270, which is an inactive electrode, may not be expended, unlike the anode 260, and thus the cathode 270 may be implemented with a lower thickness than that of the anode 260. The cathode 270 can be located inside the electrolyzer 250, and can receive the electrons generated in the anode 260 to generate hydrogen.

The cathode 270 can be made of stainless steel, for example, and can react with the electrons to generate hydrogen. That is, the chemical reaction in the cathode 270 involves the electrolyte solution 255 being dissociated, after receiving the electrons from the anode 260, to form hydrogen in the cathode 270. The reaction above can be represented by the following Reaction Scheme 1.

Anode 260: $Mg \rightarrow Mg^{2+} + 2e^-$

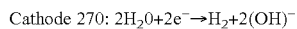

Cathode 270: $2H_2O + 2e^- \rightarrow H_2 + 2(OH)^-$

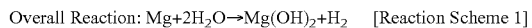

Overall Reaction: $Mg + 2H_2O \rightarrow Mg(OH)_2 + H_2$   [Reaction Scheme 1]

As such, the hydrogen generated from the cathode 270 may flow into the inflow path 210 of the gas-liquid separator 280, together with the electrolyte solution and water. As described above, since hydrogen is generated by way of dissociation of the electrolyte solution 255, some of the electrolyte solution 255 may also flow into the inflow path 210, together with the hydrogen. The oxidation-reduction reaction for generating the hydrogen is the exothermic reaction. Accordingly, since the temperature of the electrolyte solution 255 can be increased to 70 or 80° C., the hydrogen may be mixed with much water evaporated from the electrolyte solution 255 before flowing into the inflow path 210.

Described below is a fuel cell generation system according to an embodiment based on another aspect of the present invention.

FIG. 8 is a brief view showing a fuel cell generation system 300 according to an embodiment based on another aspect of the present invention.

The fuel cell generation system 300 according to an embodiment based on another aspect of the present invention can include an electrolyzer 350, containing an electrolyte solution 355; an anode 360, located inside the electrolyzer 350 and generating an electron; a cathode 370, located inside the electrolyzer 350 and receiving the electron from the anode 360 to generate hydrogen; an inflow path 310, into which a fluid material having the electrolyte solution 355 and water flows; the centrifugal path 120, connected to the inflow path 310 to receive the fluid material, and formed spirally such that the fluid material is separated into the electrolyte solution and the hydrogen by the difference in centrifugal forces, an outer side of the centrifugal path 120 having stronger affinity for the electrolyte solution than an inner side of the centrifugal path 120; an outflow path 330, discharging the electrolyte solution and the hydrogen, separated in the centrifugal path 120; and a fuel cell 395, converting chemical energy of the hydrogen, discharged from the outflow path 330, to electric energy.

As a result in accordance with an embodiment based on another aspect of the present invention, it is possible to generate the highly pure hydrogen by using the spiral centrifugal path 120 in which the outer side has stronger affinity for the liquid than the inner side. This can improve the efficiency of generating electric energy by the fuel cell 395.

In the fuel cell generation system 300 according to an embodiment based on another aspect of the present invention, a gas-liquid separator 380, the centrifugal path 120 (refer to FIG. 1), a main plate 322, a cover plate 324, the outflow path 330, a liquid discharge path 332, a gas discharge path 334, a the cooling plate 340 can have the same or corresponding configurations and functions as compared with those of the aforementioned embodiments. Accordingly, the overlapped description will be omitted. The cell fuel 395, which is different from those of the aforementioned embodiments, will be described below.

The fuel cell 395 can convert chemical energy of hydrogen, which has been generated in the cathode 370 and discharged through the outflow path 330, to electric energy. In particular, the hydrogen having been generated in the cathode 370 can be separated in the gas-liquid separator 380 before traveling to a cell electrode of the cell fuel 395, and then the cell fuel 395 can produce the direct current by converting the chemical energy of the generated hydrogen to electric energy.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A gas-liquid separator comprising:
    a main plate having a main surface and a side surface extending along an outside edge of the main plate;
    an inflow path, into which a fluid material flows, the fluid material having a liquid and a gas;
    a spiral path formed in the main surface of the main plate, connected to the inflow path to receive the fluid material and formed spirally such that the fluid material is separated into the liquid and the gas by a difference in centrifugal forces, an outer side of the spiral path having stronger affinity for the liquid than an inner side of the spiral path and the outer side of the spiral path being hydrophilic and the inner side of the spiral path being hydrophobic; and
    an outflow path, connected to the spiral path and discharging the liquid and the gas, which have been separated in the spiral path,
    wherein the spiral path has an increasing radius of curvature from one end to an other end, and is placed on a same virtual plane,
    the inflow path is connected to the one end of the spiral path and the outflow path is connected to the other end of the spiral path,
    the outflow path passes through the side surface of the main plate, and
    the outflow path comprises:
    a liquid discharge path connected to the outer side of the spiral path so as to discharge the liquid; and
    a gas discharge path connected to the inner side of the spiral path so as to discharge the gas.

2. The gas-liquid separator of claim 1, wherein the spiral path comprises a spiral groove formed in the main surface of the main plate and a cover plate, which covers an opening of the spiral groove.

3. The gas-liquid separator of claim 1, further comprising a cooling plate, configured to condense water, which has been included in the gas and thus supplied to spiral path.

4. A hydrogen generating apparatus, comprising:
    an electrolyzer, configured to contain an electrolyte solution;
    an anode, located inside the electrolyzer and generating an electron;
    a cathode, located inside the electrolyzer and receiving the electron from the anode to generate hydrogen;
    an inflow path, into which a fluid material flows, the fluid material having the electrolyte solution and the hydrogen;
    a main plate having a main surface and a side surface extending along an outside edge of the main plate;
    a spiral path formed in the main surface of the main plate, connected to the inflow path to receive the fluid material and formed spirally such that the fluid material is separated into the electrolyte solution and the hydrogen by a difference in centrifugal forces, an outer side of the spiral path having stronger affinity for the electrolyte solution than an inner side of the spiral path and the outer side of the spiral path being hydrophilic and the inner side of the spiral path being hydrophobic; and
    an outflow path, connected to the spiral path and discharging the electrolyte solution and the hydrogen, which have been separated in the spiral path,
    wherein the spiral path has an increasing radius of curvature from one end to an other end, and is placed on a same virtual plane,
    the inflow path is connected to the one end of the spiral path and the outflow path is connected to the other end of the spiral path,
    the outflow path passes through the side surface of the main plate, and
    the outflow path comprises:
    a liquid discharge path connected to the outer side of the spiral path so as to discharge the liquid; and
    a gas discharge path connected to the inner side of the spiral path so as to discharge the gas.

5. The apparatus of claim 4, wherein the spiral path comprises a spiral groove formed in the main surface of the main plate and a cover plate, which covers an opening of the spiral groove.

6. The apparatus of claim 4, further comprising a cooling plate, configured to condense water, which has been included in the hydrogen and thus supplied to the spiral path.

7. A fuel cell generating system, comprising:
    an electrolyzer, configured to contain an electrolyte solution;
    an anode, located inside the electrolyzer and generating an electron;
    a cathode, located inside the electrolyzer and receiving the electron from the anode to generate hydrogen;
    an inflow path, into which a fluid material flows, the fluid material having the electrolyte solution and the hydrogen;
    a main plate having a main surface and a side surface extending along an outside edge of the main plate;
    a spiral path formed in the main surface of the main plate, connected to the inflow path to receive the fluid material and formed spirally such that the fluid material is separated into the electrolyte solution and the hydrogen by a difference in centrifugal forces, an outer side of the spiral path having stronger affinity for the electrolyte solution than an inner side of the spiral path and the outer side of the spiral path being hydrophilic and the inner side of the spiral path being hydrophobic;
    an outflow path, connected to the spiral path and discharging the electrolyte solution and the hydrogen, which have been separated in the spiral path; and
    a fuel cell, configured to convert chemical energy of the hydrogen, discharged from the spiral path, to electrical energy,
    wherein the spiral path has an increasing radius of curvature from one end to an other end, and is placed on a same virtual plane,
    the inflow path is connected to the one end of the centrifugal path and the outflow path is connected to the other end of the spiral path,
    the outflow path passes through the side surface of the main plate, and
    the outflow path comprises:
    a liquid discharge path connected to the outer side of the spiral path so as to discharge the liquid; and
    a gas discharge path connected to the inner side of the spiral path so as to discharge the gas.

8. The system of claim 7, wherein the spiral path comprises a spiral groove formed in the main surface of the main plate and a cover plate, which covers an opening of the spiral groove.

9. The system of claim 7, further comprising a cooling plate, configured to condense water, which has been included in the hydrogen and thus supplied to the spiral path.

10. The gas-liquid separator of claim 1, wherein the side surface extends substantially perpendicular to the main surface.

11. The apparatus of claim 4, wherein the side surface extends substantially perpendicular to the main surface.

12. The system of claim 7, wherein the side surface extends substantially perpendicular to the main surface.

* * * * *